US010267271B2

(12) United States Patent
Huang

(10) Patent No.: US 10,267,271 B2
(45) Date of Patent: Apr. 23, 2019

(54) TEMPERATURE-CONTROLLABLE ENGINE FUEL SUPPLY DEVICE

(71) Applicant: Hung-Yi Huang, Yilan County (TW)

(72) Inventor: Hung-Yi Huang, Yilan County (TW)

(*) Notice: Subject to any disclaimer, the term of this patent is extended or adjusted under 35 U.S.C. 154(b) by 0 days.

(21) Appl. No.: 15/635,195

(22) Filed: Jun. 28, 2017

(65) Prior Publication Data
US 2018/0038323 A1    Feb. 8, 2018

(30) Foreign Application Priority Data

Aug. 5, 2016  (TW) .............. 105211913 A

(51) Int. Cl.
F02M 31/20    (2006.01)
F02M 27/08    (2006.01)
F02M 53/04    (2006.01)

(52) U.S. Cl.
CPC ............ F02M 31/20 (2013.01); F02M 27/08 (2013.01); F02M 53/043 (2013.01); F02M 2200/248 (2013.01); Y02T 10/126 (2013.01)

(58) Field of Classification Search
CPC ............... F02D 41/0025; F02D 41/144; F02D 41/3094; F02M 69/046; F02M 53/04; F02M 69/044
See application file for complete search history.

(56) References Cited

U.S. PATENT DOCUMENTS

| 5,190,001 A * | 3/1993 | Dieter ................ F02D 19/0628 123/1 A |
| 2003/0188726 A1* | 10/2003 | Watanabe .............. F02M 53/06 123/557 |
| 2006/0249129 A1* | 11/2006 | Ozdemir ............. F02D 41/0002 123/672 |
| 2007/0251509 A1* | 11/2007 | Nakano ............... F02D 41/0045 123/519 |
| 2011/0259285 A1* | 10/2011 | Michikawauchi .......................... F02M 21/0206 123/3 |

* cited by examiner

Primary Examiner — Long T Tran
(74) Attorney, Agent, or Firm — Chun-Ming Shih; HDLS IPR Services

(57) ABSTRACT

A temperature-controllable engine fuel supply device is used to feed fuel into a fuel inlet (40) of an engine (40). The temperature-controllable engine fuel supply device includes a fuel tank (1) for receiving the fuel, a cooling unit (2) and a nozzle (3). The cooling unit (2) communicates with the fuel tank (1) to cool the fuel. The nozzle (3) is disposed corresponding to the fuel inlet (40) to jet the fuel toward the fuel inlet (40). A cooling path (P) through which the fuel passes is from the cooling unit (2), through the nozzle (3), to the fuel inlet (40). A temperature sensor (21), (23) is installed on the cooling path (P) to detect temperature of the fuel, so temperature of the fuel is controlled to be within an ideal range before the fuel enters the engine (4).

11 Claims, 4 Drawing Sheets

TEMPERATURE-CONTROLLABLE ENGINE FUEL SUPPLY DEVICE

TECHNICAL FIELD

The present invention relates to an engine and, in particular, to a temperature-controllable engine fuel supply device.

BACKGROUND

Lowering temperature to increase oxygen density of fuel can boost engine combustion efficiency and increase output power, and this method has become a widely adopted method to improve engine efficiency.

However, after the fuel starts cooling and before the fuel is jetted into the engine, the fuel may be at a relatively high temperature rather than at an ideal low temperature due to high temperature of the engine or high ambient temperature, and consequently, the oxygen density cannot be optimized.

In views of this, in order to solve the above disadvantages, the present inventor studied related technology and provided a reasonable and effective solution in the present disclosure.

SUMMARY

It is an object of the present invention to provide a temperature-controllable engine fuel supply device which additionally has at least one temperature sensor installed in an area starting from where fuel starts cooling before where the fuel is jetted into an engine, so that it can be detected whether temperature of the fuel is at a predetermined value or within a predetermined range, and thereby it can be determined whether equipment for cooling the fuel should further cool the fuel or maintain the predetermined temperature. As a result, temperature of the fuel jetted into the engine can be within an ideal temperature range to allow the fuel to have an optimal oxygen density.

Accordingly, the present invention provides a temperature-controllable engine fuel supply device for feeding the fuel into a fuel inlet of an engine. The temperature-controllable engine fuel supply device includes a fuel tank for receiving the fuel, a cooling unit and a nozzle. The cooling unit communicates with the fuel tank through a first fuel pipe, so that the fuel from the fuel tank passes through the first fuel pipe and then enters the cooling unit to be cooled. The nozzle is disposed corresponding to the fuel inlet and communicates with the cooling unit through a second fuel pipe, so that the fuel from the cooling unit passes through the second fuel pipe and then is jetted from the nozzle toward the fuel inlet. A cooling path is defined from the cooling unit, through the second fuel pipe, through the nozzle, to the fuel inlet. A temperature sensor detects temperature of the fuel passing through the cooling path.

BRIEF DESCRIPTION OF THE DRAWINGS

The disclosure will become more fully understood from the detailed description, and the drawings given herein below is for illustration only, and thus does not limit the disclosure, wherein.

DETAILED DESCRIPTION

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Figure 1:
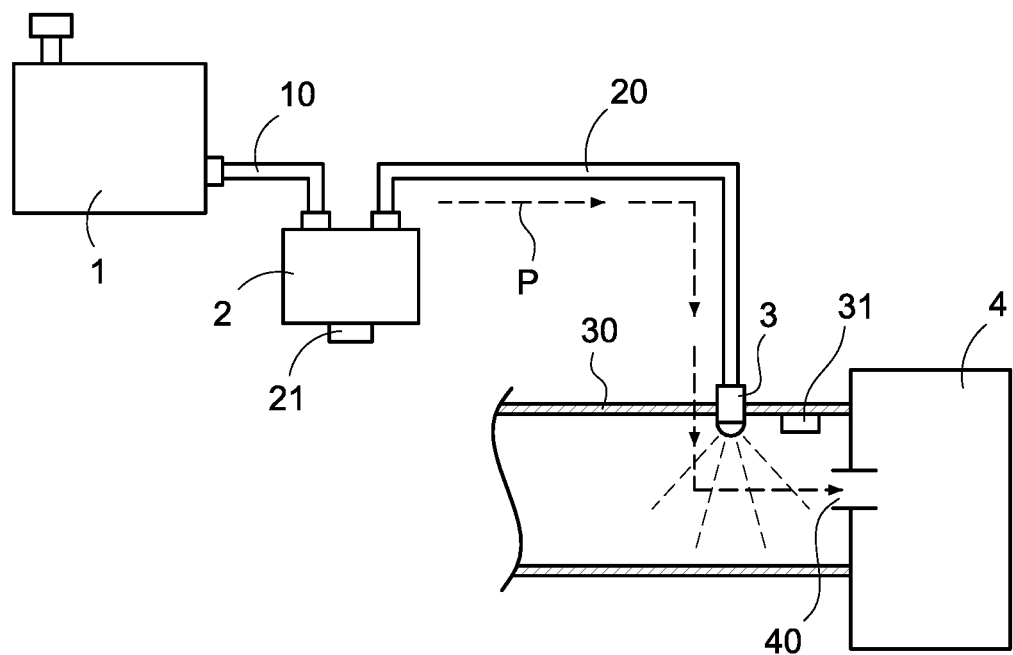
FIG. 1 is a schematic view showing a temperature-controllable engine fuel supply device according to the first embodiment of the present invention.

Please refer to FIG. 1, showing the first embodiment of the present invention. The present invention provides a temperature-controllable engine fuel supply device for feeding fuel into an engine 4. The engine 4 includes a fuel inlet 40. The temperature-controllable engine fuel supply device jets the fuel toward the fuel inlet 40 to feed the fuel into the engine 4. The temperature-controllable engine fuel supply device includes a fuel tank 1, a cooling unit 2 and a nozzle 3.

The fuel tank 1 is used to receive the fuel (not illustrated). The fuel can be gasoline (fuel oil) or water (a liquid for combustion). The fuel tank 1 can be a gasoline tank or a water tank.

The cooling unit 2 communicates with the fuel tank 1 through a first fuel pipe 10. The first fuel pipe 10 communicates between the fuel tank 1 and the cooling unit 2, so that the fuel from the fuel tank 1 passes through the first fuel pipe 10 to enter the cooling unit 2 to be cooled. In the embodiment of the present invention, the cooling unit 2 can be a water-cooled head. The fuel passing through the cooling unit 2 is cooled by a low-temperature coolant inside the cooling unit 2.

The nozzle 3 is disposed corresponding to the fuel inlet 40 of the engine 4. The nozzle 3 communicates with the cooling unit 2 through a second fuel pipe 20. In other words, the second fuel pipe 20 communicates between the cooling unit 2 and the nozzle 3, so that the fuel from the cooling unit 2 passes through the second fuel pipe 20 and then is jetted from the nozzle 3 toward the fuel inlet 40 of the engine 4 to be fed into the engine for combustion. In the embodiment of the present invention, the nozzle 3 is disposed on an intake manifold 30, the nozzle 3 communicates with the fuel inlet 40 of the engine 4 via the intake manifold 30, so that mixed gases can be provided via the intake manifold 30 to the engine 4 for combustion. Furthermore, the nozzle 3 can be a constant flow jetting head, a controllable jetting head, or an ultrasonic-atomization jetting head.

In the present invention, there is at least one temperature sensor 21 or/and 31 in areas among the cooling unit 2, the second fuel pipe 20 and the nozzle 3 and an area between the nozzle 3 and the fuel inlet 40 of the engine 4. To be specific, a cooling path P is defined from the cooling unit 2, through the second fuel pipe 20, through the nozzle 3, to the fuel inlet

40. The cooling path P is an area from where the fuel starts cooling and before where the fuel enters the engine 4, and the temperature sensor 21 or/and 31 is installed on the cooling path P.

Figure 2:
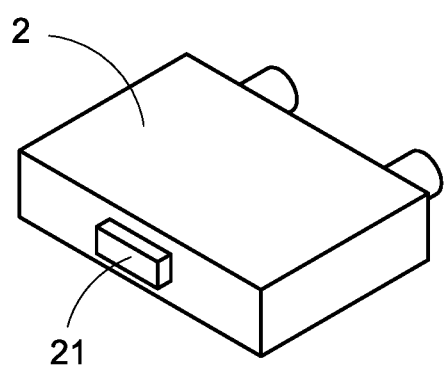
FIG. 2 is an appearance view showing a cooling unit of the present invention.

In the embodiment of the present invention, the temperature sensor 21 or/and 31 at least includes a first sensor 31 and a second sensor 21. The first sensor 31 is disposed on the intake manifold 30, between the nozzle 3 and the fuel inlet 40 on the cooling path P. The second sensor 21 is disposed on the cooling unit 2 (as shown in FIG. 2). The first sensor 31 detects temperature of the fuel before it enters the engine 4, to thereby ensure the fuel to enter the engine 4 at an ideal low temperature (if the fuel is water, then the ideal low temperature is about 4 degrees). The second sensor 21 detects temperature of the fuel in the cooling unit 2, so that there would be sufficient time for further cooling the fuel to the ideal low temperature before the fuel enters the engine 4 (if the fuel is water, the ideal low temperature is below 4 degrees and higher than a temperature at which the water starts to freeze).

Accordingly, when the first sensor 31 and the second sensor 21 detect that temperature of the fuel is not within an ideal low temperature range, an outside system (e.g. an engine starter or a computer system) controls the cooling unit 2 to cool the fuel, so that the fuel passes through the cooling unit 2 can be cooler. When the first sensor 31 and the second sensor 21 detect that temperature of the fuel is below the ideal low temperature range, the cooling unit 2 can be controlled to raise temperature of the fuel to avoid freezing the fuel (if the fuel is water).

Figure 3:
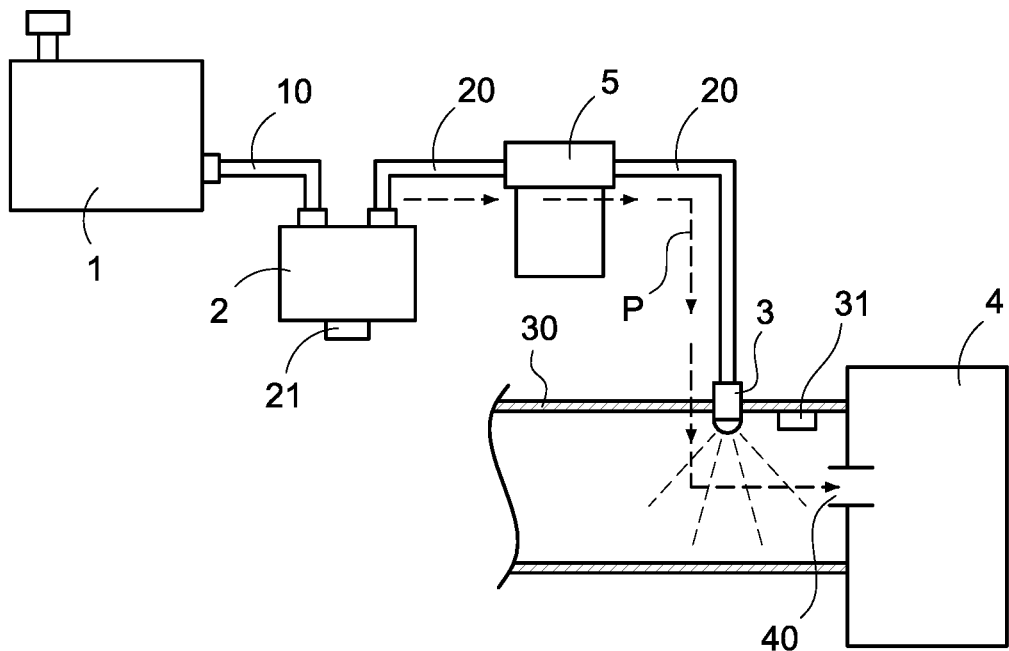
FIG. 3 is a schematic view showing the temperature-controllable engine fuel supply device according to the second embodiment of the present invention.

The structure of the temperature-controllable engine fuel supply device of the present invention is mainly described above. Please refer to FIG. 3 showing the second embodiment of the present invention. A pump 5 is connected to the second fuel pipe 20 to enable the fuel to quickly pass through the cooling path P, thereby preventing the fuel which has been cooled to an ideal temperature from being warmer due to the heat of the engine 4 or due to the ambient temperature. The pump 5 is a constant pressure pump or a controllable regulating pump.

Figure 4:
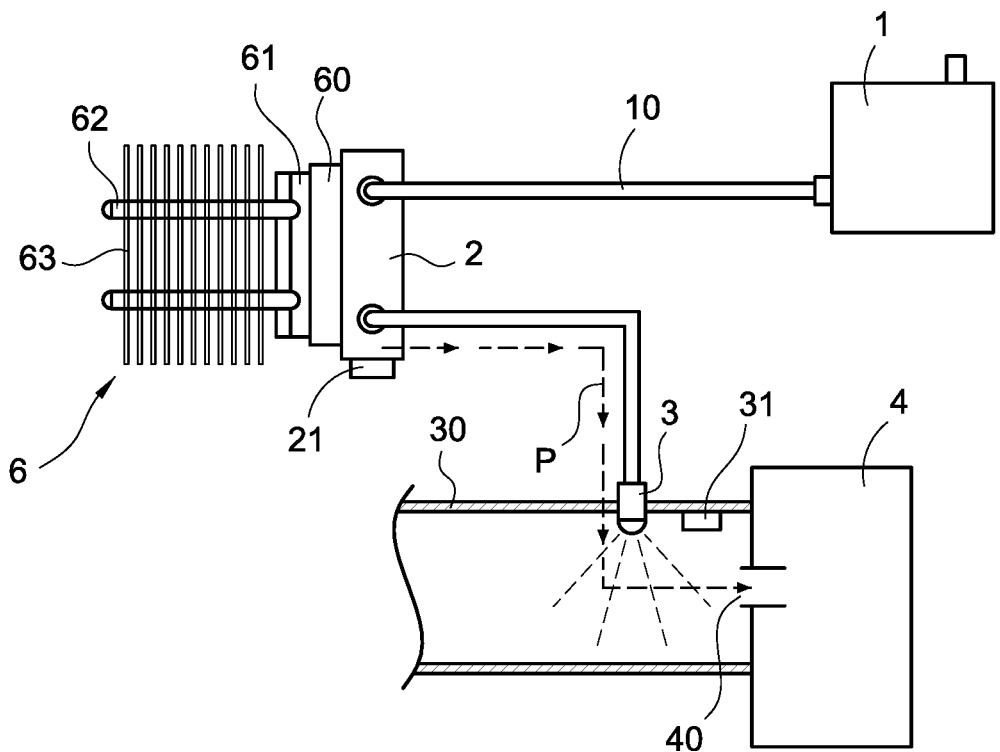
FIG. 4 is a schematic view showing the temperature-controllable engine fuel supply device according to the third embodiment of the present invention.
Figure 5:
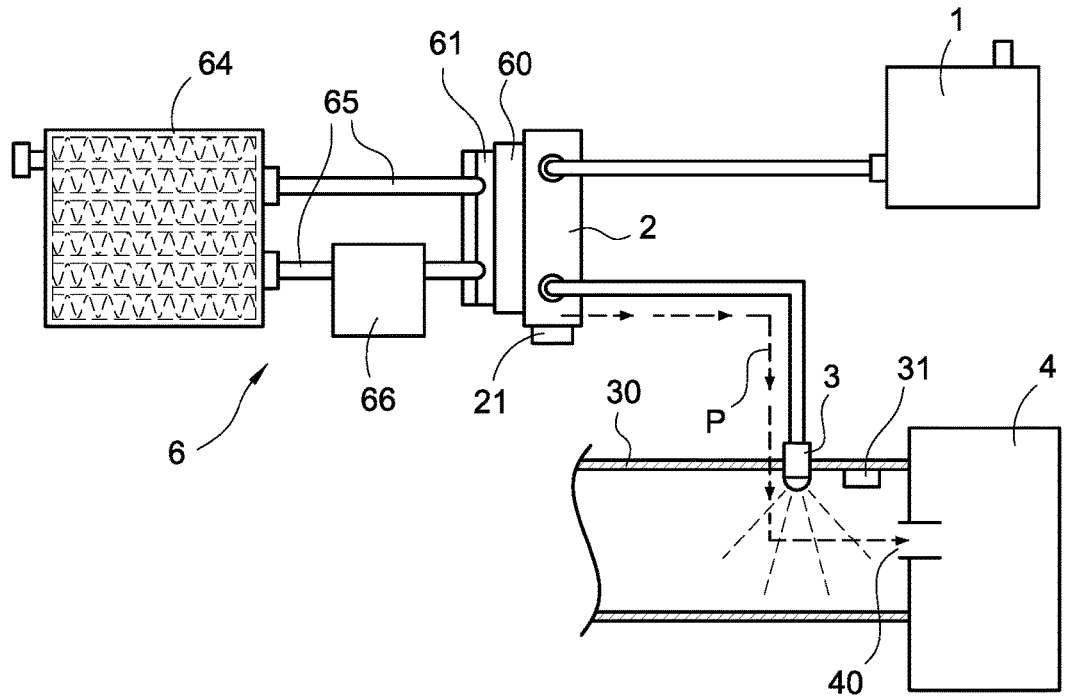
FIG. 5 is a schematic view showing the temperature-controllable engine fuel supply device according to the fourth embodiment of the present invention.

Furthermore, please refer to FIG. 4 showing the third embodiment of the present invention. A heat dissipation unit 6 is disposed on the cooling unit 2. The heat dissipation unit 6 in the present embodiment includes a cooling chip 60, a thermal conductive base 61 overlapping and contacting the cooling chip 60, at least one heat pipe 62 extending from the thermal conductive base 61, and a plurality of fins 63 connected to the heat pipe 62 in series. Moreover, please refer to FIG. 5 showing the fourth embodiment of the present invention. The heat dissipation unit 6 in the fourth embodiment includes a cooling chip 60, a thermal conductive base 61 overlapping and contacting the cooling chip 60, a water-cooled tank 64, a piping 65 connected between the thermal conductive base 61 and the water-cooled tank 64, and a heat pump 66 connected to the piping 65. Therefore, the cooling unit 2 can achieve better cooling effect by means of the heat dissipation unit 6.

Figure 6:
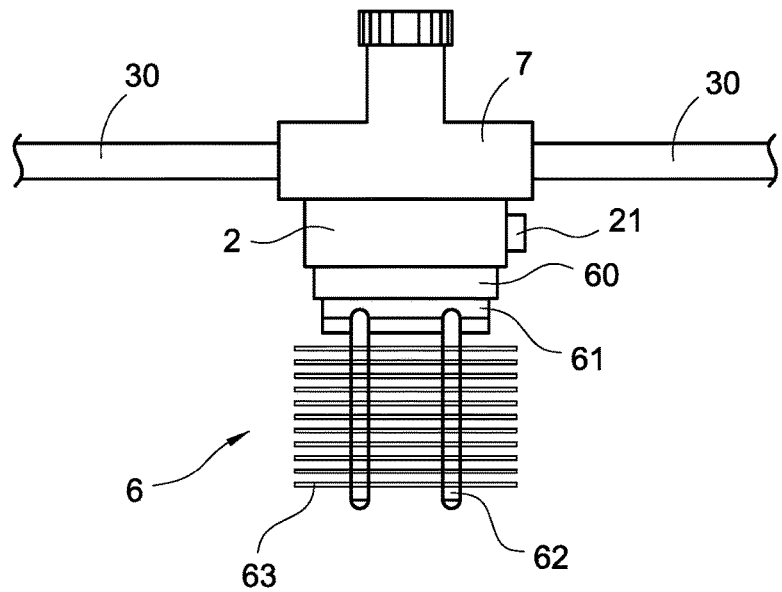
FIG. 6 is a schematic view showing the temperature-controllable engine fuel supply device according to the fifth embodiment of the present invention.
Figure 7:
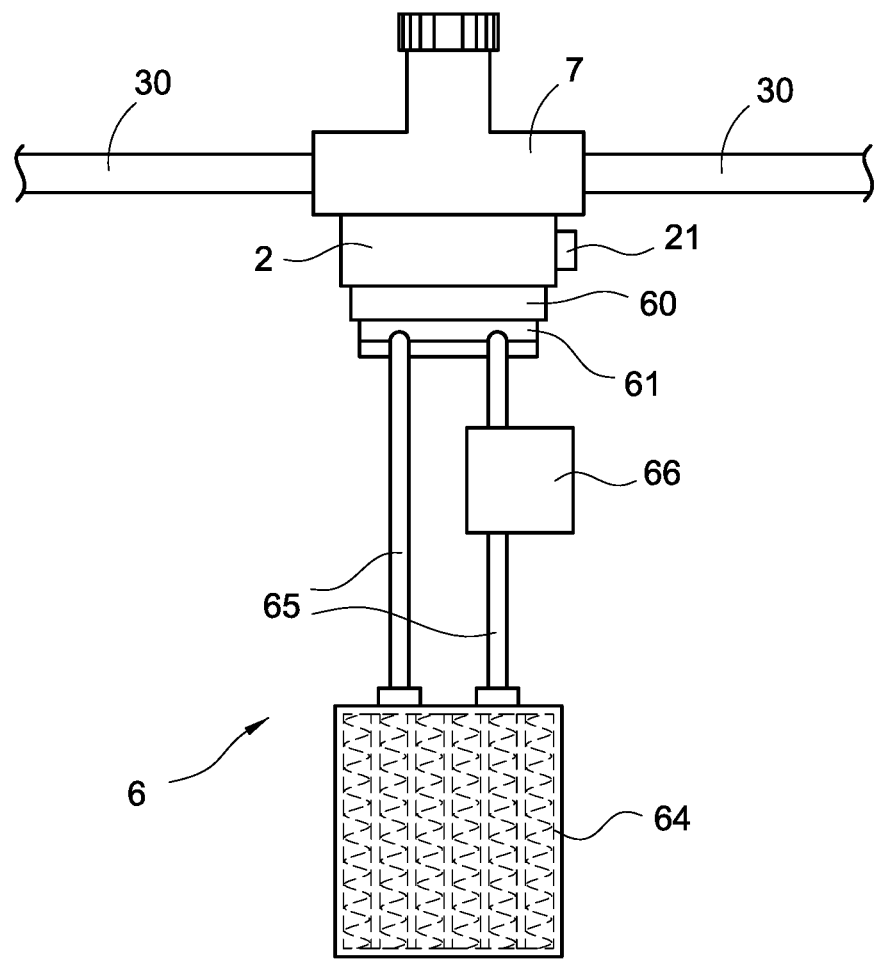
FIG. 7 is a schematic view showing the temperature-controllable engine fuel supply device according to the sixth embodiment of the present invention.

Furthermore, please refer to FIGS. 6 and 7 showing the fifth embodiment and the sixth embodiment of the present invention. In the case of use of a carburetor 7, the carburetor 7 is disposed on the intake manifold 30 and communicates with the same. The carburetor 7 overlaps and contacts the cooling unit 2, and the heat dissipation unit 6 of the third or fourth embodiment can be additionally added to the cooling unit 2.

In summary, the present invention can achieve anticipated objectives and solve the conventional defects. The present invention also has novelty and non-obviousness, so the present invention completely complies with the requirements of patentability. Therefore, a request to patent the present invention is filed pursuant to patent law. Examination is kindly requested, and allowance of the present application is solicited to protect the rights of the inventor.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A temperature-controllable engine fuel supply device, for feeding fuel into a fuel inlet (40) of an engine (4), comprising:
   a fuel tank (1) for receiving the fuel;
   a cooling unit (2), the cooling unit (2) communicating with the fuel tank (1) through a first fuel pipe (10), wherein the fuel from the fuel tank (1) passes through the first fuel pipe (10) and then enters the cooling unit (2) to be cooled; and
   a nozzle (3) disposed corresponding to the fuel inlet (40) of the engine (4), the nozzle (3) communicating with the cooling unit (2) through a second fuel pipe (20), wherein the fuel from the cooling unit (2) passes through the second fuel pipe (20) and is jetted from the nozzle (3) toward the fuel inlet (40) of the engine (4), wherein a cooling path (P) is defined from the cooling unit (2), through the second fuel pipe (20), through the nozzle (3), to the fuel inlet (40), and a temperature sensor (21), (31) detects temperature of the fuel passing through the cooling path (P);
   wherein a heat dissipation unit (6) is disposed on the cooling unit (2);
   wherein the heat dissipation unit (6) includes a cooling chip (60), a thermal conductive base (61) overlapping and contacting the cooling chip (60), a water-cooled tank (64), a piping (65) connected between the thermal conductive base (61) and the water-cooled tank (64), and a heat pump (66) connected to the piping (65).

2. The temperature-controllable engine fuel supply device according to claim 1, wherein the temperature sensor at least includes a first sensor (31), and the first sensor (31) is disposed between the nozzle (3) and the fuel inlet (40) on the cooling path (P).

3. The temperature-controllable engine fuel supply device according to claim 2, wherein the temperature sensor further includes a second sensor (21), and the second sensor (21) is disposed on the cooling unit (21).

4. The temperature-controllable engine fuel supply device according to claim 1, wherein the fuel tank (1) is a gasoline tank or a water tank.

5. The temperature-controllable engine fuel supply device according to claim 1, wherein the cooling unit (2) is a water-cooling head.

6. The temperature-controllable engine fuel supply device according to claim 1, wherein a pump (5) is connected to the second fuel pipe (20).

7. The temperature-controllable engine fuel supply device according to claim 6, wherein the pump (5) is a constant pressure pump or a controllable regulating pump.

8. The temperature-controllable engine fuel supply device according to claim 1, wherein the nozzle (4) is a constant flow jetting head, a controllable jetting head or an ultrasonic-atomization jetting head.

9. A temperature-controllable engine fuel supply device, for feeding fuel into a fuel inlet (40) of an engine (4), comprising:

a fuel tank (1) for receiving the fuel;

a cooling unit (2), the cooling unit (2) communicating with the fuel tank (1) through a first fuel pipe (10), wherein the fuel from the fuel tank (1) passes through the first fuel pipe (10) and then enters the cooling unit (2) to be cooled;

a nozzle (3) disposed corresponding to the fuel inlet (40) of the engine (4), the nozzle (3) communicating with the cooling unit (2) through a second fuel pipe (20), wherein the fuel from the cooling unit (2) passes through the second fuel pipe (20) and is jetted from the nozzle (3) toward the fuel inlet (40) of the engine (4), wherein a cooling path (P) is defined from the cooling unit (2), through the second fuel pipe (20), through the nozzle (3), to the fuel inlet (40), and a temperature sensor (21), (31) detects temperature of the fuel passing through the cooling path (P); and an intake manifold (30) communicating with the fuel inlet (40) of the engine (4), a carburetor (7) is disposed on the intake manifold (30), and the carburetor (7) overlaps and contacts the cooling unit (2).

10. The temperature-controllable engine fuel supply device according to claim 9, wherein a heat dissipation unit (6) is disposed on the cooling unit (2).

11. A temperature-controllable engine fuel supply device, for feeding fuel into a fuel inlet (40) of an engine (4), comprising:

a fuel tank (1) for receiving the fuel;

a cooling unit (2), the cooling unit (2) communicating with the fuel tank (1) through a first fuel pipe (10), wherein the fuel from the fuel tank (1) passes through the first fuel pipe (10) and then enters the cooling unit (2) to be cooled; and a nozzle (3) disposed corresponding to the fuel inlet (40) of the engine (4), the nozzle (3) communicating with the cooling unit (2) through a second fuel pipe (20), wherein the fuel from the cooling unit (2) passes through the second fuel pipe (20) and is jetted from the nozzle (3) toward the fuel inlet (40) of the engine (4), wherein a cooling path (P) is defined from the cooling unit (2), through the second fuel pipe (20), through the nozzle (3), to the fuel inlet (40), and a temperature sensor (21), (31) detects temperature of the fuel passing through the cooling path (P);

wherein a heat dissipation unit (6) is disposed on the cooling unit (2);

wherein the heat dissipation unit (6) includes a cooling chip (60), a thermal conductive base (61) overlapping and contacting the cooling chip (60), at least one heat pipe (62) extending from the thermal conductive base (61), and a plurality of fins (63) connected to the heat pipe (62) in series.

\* \* \* \* \*